(12) United States Patent
Alsop et al.

(10) Patent No.: US 12,386,526 B2
(45) Date of Patent: Aug. 12, 2025

(54) NON-BLOCKING PARALLEL BULK MEMORY OPERATIONS

(71) Applicant: Advanced Micro Devices, Inc., Santa Clara, CA (US)

(72) Inventors: Johnathan Robert Alsop, Seattle, WA (US); Shaizeen Dilawarhusen Aga, Santa Clara, CA (US); Khaled Hamidouche, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 76 days.

(21) Appl. No.: 18/477,885

(22) Filed: Sep. 29, 2023

(65) Prior Publication Data

US 2025/0110647 A1    Apr. 3, 2025

(51) Int. Cl.
*G06F 12/00* (2006.01)
*G06F 3/06* (2006.01)

(52) U.S. Cl.
CPC .......... *G06F 3/0622* (2013.01); *G06F 3/0658* (2013.01); *G06F 3/0679* (2013.01)

(58) Field of Classification Search
CPC .......................... G06F 11/362; G06F 12/0815
See application file for complete search history.

(56) References Cited

U.S. PATENT DOCUMENTS

| | | | | |
|---|---|---|---|---|
| 2010/0332768 A1* | 12/2010 | Gray | ..................... | G06F 11/362 |
| | | | | 711/146 |
| 2024/0086195 A1* | 3/2024 | Horsnell | ............... | G06F 9/3004 |

OTHER PUBLICATIONS

"AWS Re: Invent", Amazon Web Services, Inc. [retrieved May 10, 2023]. Retrieved from the Internet <https://d1.awsstatic.com/events/Summits/reinvent2022/CMP313_Accelerate-deep-learning-and-innovate-faster-with-AWS-Trainium.pdf>., Nov. 2022, 88 Pages.

"Intel QuickAssist Technology Components", Intel Developer Forum [retrieved May 10, 2023]. Retrieved from the Internet <http://szarka.ssgg.sk/Vyuka/Prednaska-6/Technologie/QuickAssist/SP08_QATS002_100r_eng.pdf>., 32 Pages.

Blackburn, Stephen , et al., "Myths and realities: the performance impact of garbage collection", ACM Sigmetrics Performance Evaluation Review, vol. 32, No. 1 [retrieved May 10, 2023]. Retrieved from the Internet <https://www.cs.utexas.edu/users/mckinley/papers/mmtk-sigmetrics-2004.pdf>., Jun. 1, 2004, 12 Pages.

Kanev, Svilen , et al., "Profiling a warehouse-scale computer", Proceedings of the 42nd Annual International Symposium on Computer Architecture [retrieved May 10, 2023]. Retrieved from the Internet <https://pub-tools-public-publication-data.storage.googleapis.com/pdf/44271.pdf>., Jun. 13, 2015, 12 Pages.

* cited by examiner

*Primary Examiner* — Yong J Choe
(74) *Attorney, Agent, or Firm* — FIG. 1 Patents

(57) ABSTRACT

Non-blocking processing system are described. In accordance with the described techniques, a pending range store receives, at a start of a bulk memory operation, a pending memory range of the bulk memory operation. A logic unit includes at least one of check conflict logic or check address logic. The logic unit detects a conflicting memory access based on a target address of the pending memory range conflicting with a memory access request separate from the bulk memory operation. The logic unit performs at least a portion of the bulk memory operation associated with the target address before the memory access request is allowed to proceed.

20 Claims, 5 Drawing Sheets

NON-BLOCKING PARALLEL BULK MEMORY OPERATIONS

BACKGROUND

Bulk memory operations are operations that are important in multiple application domains. Bulk memory operations typically occur in a critical path of various applications and use-cases, even when a smaller subset of the output is immediately used, or is conditionally used. Bulk memory operations are used in cloud computing, memory management, garbage collection, and memory pipe (MPI) operations for high performance computing (HPC). Bulk memory operations are used in read-copy-update programming patterns, which is effective for handling weight updates in asynchronous machine learning (ML) training. In addition to optimized software implementations, hardware accelerators are increasingly used to speed up bulk memory operations.

DETAILED DESCRIPTION

Overview

Figure 1:
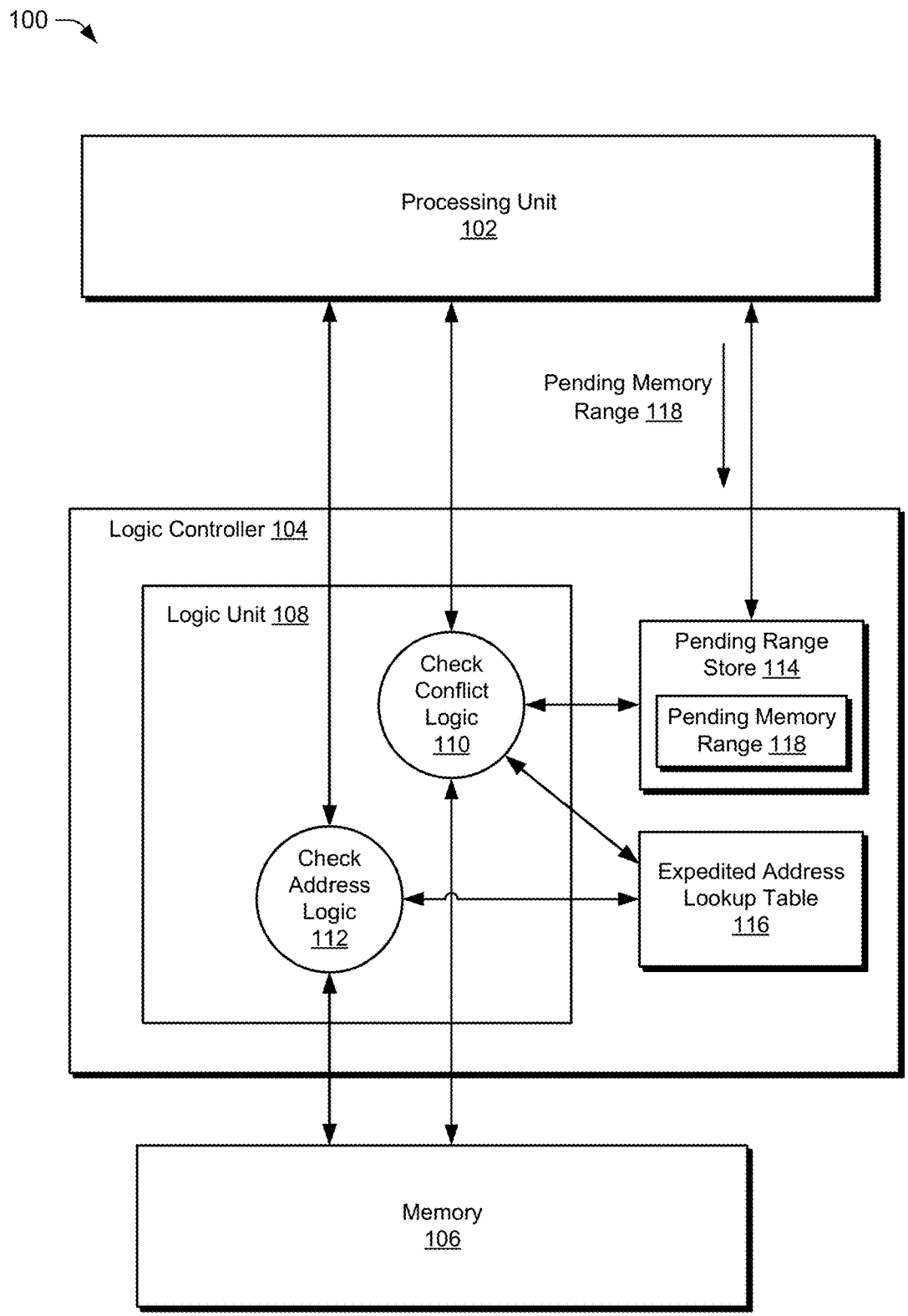
FIG. 1 is a block diagram of a non-limiting example a non-blocking processing system with logic for performing non-blocking parallel bulk memory operations.

Examples of bulk memory operations include memory copy operations (e.g., memcpy), memory move operations (e.g., memmove), and memory set operations (e.g., memset), bulk add operations, bulk reduction operations, constant add operations, multi-operand bulk functions (e.g., vector add), and the like.

Bulk memory operations (e.g., bulk parallelizable memory operations) increase latency to the critical path of various applications. Latency increases because an application performs a bulk memory operation and then wait for the bulk memory operation to complete before continuing to another task or allowing another thread to continue to another task. For example, a first operation (e.g., bulk memory operation) transmits a block of data via memory pipe (MPI), which includes copying the data to a transfer buffer. Immediately after the first operation is initiated, a second operation executes that conditionally operates on that same block of data. Based on conventional approaches, if the second operation operates on the source data before the first operation completes, then the second operation corrupts the block of data. In some scenarios, an application performs a bulk update (e.g., bulk memory operation) on a block of memory, and then a subsequent thread sparsely accesses the output of the update. Based on conventional approaches, the entire bulk update operation must complete before allowing the subsequent task to execute, otherwise the accessed data is corrupted by the subsequent task. In both cases, however, blocking execution until the bulk memory operation completes leads to excessive stalling and critical path latency.

Conventional approaches use hardware accelerators to address the blocking issues of bulk memory operations. Hardware accelerators, however, still perform serialized execution of memory accesses for bulk memory operations, even though they occasionally speed up that execution. Based on conventional approaches, any task that would potentially access memory in a way that conflicts with the data accessed by the bulk memory operation will wait until the accelerator finishes executing the entire bulk memory operation.

Some conventional approaches employ software synchronization to address the blocking issues of bulk memory operations. However, software synchronization is computationally expensive to implement as it includes multiple fine-grain atomic requests and data traffic that grows as granularity increases, which is necessary for precise completion tracking. Moreover, software synchronization does not allow fine-grain memory operations to be performed on-demand or out-of-order. If a subsequent task does access data in the same order that the bulk memory operation processes it, there will be little benefit. Accordingly, based on conventional approaches, applications suffer from increased latency and overhead due to an application waiting for the entire bulk memory operation to complete before proceeding with other operations.

Based on the techniques described herein, an application does not have to block a processing unit from continuing to process operations based on a pending or incomplete bulk memory operation. The non-blocking bulk memory operations described herein provide reduced latency, increased system performance, and improved user experience.

In one or more implementations, the described techniques provide non-blocking bulk memory operations without increasing latency by intercepting subsequent memory accesses that conflict with the bulk operation and ensuring the bulk memory operation associated with the conflicting target address completes before a conflicting memory access is allowed to proceed.

Alternatively or additionally, the non-blocking bulk memory operations include blocking a conflicting memory request until completion of at least a portion of the bulk memory operation. For example, a memory access of the bulk memory operation (e.g., a read operation or a write operation associated with a source address or a target address of the bulk memory operation) initiates or is executing before the conflicting memory request occurs. Accordingly, the non-blocking bulk memory operations detects the conflicting memory request and blocks the conflicting memory request until at least the memory access of the bulk memory operation corresponding to the conflicting address is completed (e.g., and before the overall bulk memory operation is completed).

In at least one implementation, the non-blocking bulk memory operations include eagerly performing (e.g., expediting) at least a portion of the bulk memory operation to ensure that at least the portion of the bulk memory operation (e.g., memory access) completes before the conflicting memory request is permitted to execute. For example, the non-blocking bulk memory operations perform at least a memory access of the bulk memory operation earlier than the memory access is scheduled to be performed to ensure the memory access completes before the conflicting memory request is permitted to execute. In at least one variation, the constraint of ensuring the memory access completes before the conflicting memory request is permitted to execute is satisfied by blocking the conflicting memory request and eagerly performing at least the portion of the bulk memory operation.

In one or more implementations, the non-blocking bulk memory operations include detecting when a portion of the bulk memory operation has previously been expedited and discarding (e.g., skipping, bypassing, dropping) the portion of the bulk memory operation based on the detecting. For example, a memory access of the bulk memory operation is eagerly performed to ensure the memory access completes before a conflicting memory request is permitted to execute. Subsequently, the same memory access is provided for execution as originally scheduled (e.g., issued as part of the bulk memory operation). The non-blocking bulk memory operations detect that the memory access is already executed (e.g., eagerly performed, expedited), and thus, the non-blocking bulk memory operations drop the already executed memory access.

Accordingly, the non-blocking parallel bulk memory operations described herein provide data secure non-blocking execution of bulk memory operations and subsequent tasks with arbitrary access orders, thus avoiding the significant synchronization overhead and relatively high latency incurred by conventional approaches and enabling out-of-order conflicting memory access patterns that conventional approaches do not provide.

In some aspects, the techniques described herein relate to a logic controller including: a pending range store to receive, at a start of a bulk memory operation, a pending memory range of the bulk memory operation, and a logic unit to: detect a conflicting memory access based on a target address of the pending memory range conflicting with a memory access request separate from the bulk memory operation, and perform at least a portion of the bulk memory operation associated with the target address before the memory access request is allowed to proceed.

In some aspects, the techniques described herein relate to a logic controller, wherein the logic controller intercepts memory operations, including the bulk memory operation, between a processing unit of a computing device and a memory of the computing device, the logic controller being physically located between the processing unit and the memory.

In some aspects, the techniques described herein relate to a logic controller, wherein the logic unit detects the conflicting memory access based on the logic unit performing an address range check of the pending memory range or a page address comparison with an entry of the pending memory range.

In some aspects, the techniques described herein relate to a logic controller, wherein, based on the conflicting memory access, the logic unit is further configured to block the conflicting memory access until the target address is no longer pending in the pending memory range of the pending range store.

In some aspects, the techniques described herein relate to a logic controller, wherein, based on the conflicting memory access, the logic unit is further configured to expedite execution of at least the portion of the bulk memory operation associated with the target address.

In some aspects, the techniques described herein relate to a logic controller, further including an expedited address lookup table, wherein, based on the execution being expedited, the logic unit is further configured to log the target address in the expedited address lookup table.

In some aspects, the techniques described herein relate to a logic controller, wherein the logic unit is further configured to: perform an address range check on the expedited address lookup table before execution of the portion of the bulk memory operation is expedited, and allow the execution to proceed when the address range check indicates the portion of the bulk memory operation associated with the target address is not already executed.

In some aspects, the techniques described herein relate to a logic controller, wherein the logic unit is further configured to: perform an address range check on at least one address of the pending memory range of the bulk memory operation or the expedited address lookup table, and discard the memory access request when the address range check indicates the portion of the bulk memory operation associated with the target address is completed.

In some aspects, the techniques described herein relate to a logic controller, wherein the logic unit is further configured to store memory access types associated with the bulk memory operation, and wherein detecting the conflicting memory access is based at least in part on an access type of the memory access request.

In some aspects, the techniques described herein relate to a logic controller, wherein the logic unit is further configured to receive an updated pending memory range different from the pending memory range at the start of the bulk memory operation, the updated pending memory range removing one or more completed addresses from the pending memory range associated with a completed portion of the bulk memory operation.

In some aspects, the techniques described herein relate to a method for non-blocking parallel bulk memory operations, the method including: receiving, at a start of a bulk memory operation, a pending memory range of the bulk memory operation, detecting a conflicting memory access based on a target address of the pending memory range conflicting with a memory access request separate from the bulk memory operation, and performing at least a portion of the bulk memory operation associated with the target address before the memory access request is allowed to proceed.

In some aspects, the techniques described herein relate to a method, wherein the detecting the conflicting memory access is based on performing an address range check of the pending memory range or a page address comparison with an entry of the pending memory range.

In some aspects, the techniques described herein relate to a method, further including blocking the conflicting memory access until the target address is no longer pending in the pending memory range that is stored in a pending range store.

In some aspects, the techniques described herein relate to a method, further including expediting, based on the conflicting memory access, execution of at least the portion of the bulk memory operation associated with the target address.

In some aspects, the techniques described herein relate to a method, wherein the expediting execution includes: logging the target address in an expedited address lookup table, performing an address range check on the expedited address lookup table before execution of the portion of the bulk memory operation is expedited, and allowing the execution to be expedited when the address range check indicates the portion of the bulk memory operation associated with the target address is not already executed.

In some aspects, the techniques described herein relate to a system including: a processing unit, a memory, and a logic controller physically located between and communicatively linked to the processing unit and the memory, the logic controller being configured to: receive, from the processing unit at a start of a bulk memory operation, a pending memory range of the bulk memory operation, the pending memory range including at least one of a starting address, a source memory range, or a destination memory range, detect a conflicting memory access based on a target address of the pending memory range conflicting with a memory access request of the memory separate from the bulk memory operation, and send a portion of the bulk memory operation associated with the target address to the memory before the memory access request is allowed to proceed.

In some aspects, the techniques described herein relate to a system, wherein the logic controller detects the conflicting memory access based on the logic controller performing an address range check of the pending memory range or a page address comparison with an entry of the pending memory range.

In some aspects, the techniques described herein relate to a system, wherein, based on the conflicting memory access, the logic controller is further configured to block the conflicting memory access until the target address is no longer pending in the pending memory range that is stored in a pending range store.

In some aspects, the techniques described herein relate to a system, wherein, based on the conflicting memory access, the logic controller is further configured to expedite execution of the portion of the bulk memory operation associated with the target address, the logic controller including at least one of check conflict logic or check address logic, the check conflict logic being configured to track the bulk memory operation and intercept memory accesses that conflict with or are part of the bulk memory operation, and the check address logic being configured to check an address associated with a potential conflicting memory access request against the pending memory range of the bulk memory operation.

In some aspects, the techniques described herein relate to a system, wherein to expedite the execution includes the logic controller being further configured to: log the target address in an expedited address lookup table, perform an address range check on the expedited address lookup table before execution of the portion of the bulk memory operation is expedited, and allow the execution to be expedited when the address range check indicates the portion of the bulk memory operation associated with the target address is not already executed.

FIG. 1 is a block diagram of a non-limiting example implementation 100 of a non-blocking processing system having logic for performing non-blocking parallel bulk memory operations. The described techniques of the non-blocking processing system provide non-blocking bulk memory operations, enabling subsequent (e.g., potentially conflicting) tasks to execute before a bulk memory operation is completed, resulting in reduced latency, reduced total execution time, and improved user experience.

In the illustrated example, the implementation 100 depicts a processing unit 102, a logic controller 104, and a memory 106. As shown, the processing unit 102 is communicatively linked to the logic controller 104, and the logic controller 104 is communicatively linked to the memory 106.

Examples of the processing unit include a central processing unit, a graphical processing unit, a direct memory access (DMA) engine, a remote DMA engine, a hardware accelerator, a field programmable gate array (FPGA), an application-specific integrated circuit (ASIC), and the like.

As shown, the logic controller 104 is positioned on a path between the processing unit 102 and the memory 106. For instance, the logic controller 104 is located physically, communicatively, and/or topologically between the processing unit 102 and the memory 106. The logic controller 104 is positioned to intercept memory access requests from the processing unit 102. In some implementations, the logic controller 104 is positioned at or relatively close to memory 106. In some implementations, the logic controller 104 is positioned at or relatively close to a memory controller of memory 106. In some implementations, the logic controller 104 is positioned at or relatively close to processing unit 102 (e.g., on silicon of a core of processing unit 102).

In the depicted example, the logic controller 104 includes a logic unit 108, a pending range store 114, and an expedited address lookup table 116. In one or more variations, the logic controller 104 and/or the logic unit 108 are implemented in any of a variety of different manners such as hardware circuitry, software or firmware executing on a programmable processor, or any combination of two or more of hardware, software, and firmware. Examples of the logic controller 104 and/or the logic unit 108 include a general purpose processor, a special purpose processor, a conventional processor, a digital signal processor (DSP), a graphics processing unit (GPU), a parallel accelerated processor, one or more microprocessors, one or more microprocessors in association with a DSP core, a controller, a microcontroller, Application Specific Integrated Circuits (ASICs), one or more Field Programmable Gate Arrays (FPGAs) circuits, any other type of integrated circuit (IC), and/or a state machine. In one or more variations, the pending range store 114 is any of a variety of forms of non-transitory computer-readable media configured to store one or more address ranges and/or one or more sets of physical pages. Examples of the pending range store 114 include non-volatile memory, read-only memory (ROM), a random-access memory (RAM), one or more registers, cache memory, semiconductor memory devices, magnetic media, and/or one or more tables stored in such memory or storage structures.

As shown, the logic unit 108 includes check conflict logic 110 and check address logic 112. In at least one variation, the logical operations of the logic unit 108 are performed by the check conflict logic 110, the check address logic 112, or both. The check conflict logic 110 is configured to track pending bulk memory operations of processing unit 102 and intercept memory accesses that conflict with or are part of a pending bulk memory operation. The check address logic 112 is configured to check an address associated with a potential conflicting memory access request against a pending range of addresses of a bulk memory operation, thus ensuring that execution of the bulk memory operation is consistent with the execution of serialized memory accesses.

Consider an illustrative example scenario of the implementation 100 where the processing unit 102 provides a bulk memory operation to the logic controller 104 (e.g., the logic controller 104 intercepts a bulk memory operation from the processing unit 102). In some implementations, the processing unit 102 provides a pending memory range 118 (e.g., a range of addresses, a set of physical pages) associated with the bulk memory operation. Thus, the pending memory range 118 includes one or more address ranges or a set of page addresses that are accessed by a bulk memory operation. The pending memory range 118 includes a contiguous range of memory addresses or two or more non-contiguous ranges of memory addresses. The pending memory range 118 includes tiled ranges of memory addresses that include additional metadata, address ranges defined by combinations of address bits that match a certain value or fall within a certain address range. Additionally or alternatively, the memory address range 118 is specified by page address, by a matching set of address bits, by two-dimensional tile addresses. Additionally or alternatively, the memory address range 118 is specified by base address, by memory size, a number of columns of memory addresses, a number of rows of memory addresses, stride, a bloom filter mask based on address bits, and the like.

In some examples, the pending memory range 118 includes address ranges accessed by the bulk memory operation. For example, the pending memory range 118 includes source address ranges of where data is being copied from and/or destination address ranges of where data is being copied to. In some implementations, the processing unit 102 provides a compact representation of the bulk memory operation to logic controller 104 (e.g., to pending range store 114). In various implementations, the compact representation includes at least one of a starting source address, a size for a source memory range, a starting destination address, or a size of a destination memory range associated with the bulk memory operation.

In various implementations, the pending memory range 118 includes memory access types associated with a pending bulk memory operation (e.g., based on a conflict occurring when at least one memory access is a write operation). For example, a conflict occurs when a memory access of the bulk memory operation is a write operation or a memory access of the conflicting memory access request is a write operation (e.g., or both are write operations).

In some implementations, the logic controller 104 updates a pending memory range of the pending range store 114 on an ongoing basis. For example, the logic controller 104 provides an initial pending memory range (e.g., pending memory range 118), and subsequently, the logic controller 104 updates the pending memory range 118 in conjunction with the processing unit 102.

In one or more cases, the pending memory range 118 is updated based on a threshold portion or threshold percentage of the bulk memory operation being completed. For example, the logic controller 104 updates the pending memory range 118 (e.g., remove addresses of completed portions of the bulk memory operation) at one or more thresholds (e.g., at 25% of the bulk memory operation completed, 50% completed, 75% completed, 100% completed, and the like). In one or more cases, the logic controller 104 updates the pending memory range 118 based on one or more lapsed time periods relative to a start time of the bulk memory operation. In at least one case, the logic controller 104 tracks the progress of a bulk memory operation, tracking how many steps or sub-operations of the bulk memory operation are completed and updates the pending memory range 118 accordingly (e.g., when one or more threshold number of steps or sub-operations are completed, remove the associated addresses from the pending memory range 118). In one or more cases, the logic controller 104 clears the pending memory range 118 when the bulk memory operation completes.

In some implementations, the logic controller 104 tracks the pending memory operations of the bulk memory operation (e.g., tracking one or more address ranges or one or more lists of pages of the bulk memory operation). In at least one case, the logic controller 104 tracks the pending memory operations in parallel with the execution of the bulk memory operation.

The logic controller 104 (e.g., via the check conflict logic 110) monitors for a memory access request (e.g., separate from the bulk memory operation) that conflicts with the pending memory range 118 of the bulk memory operation that are stored in pending range store 114. In one or more cases, the logic controller 104 monitors for memory access requests in parallel with the execution of the bulk memory operation.

A conflicting access is defined as an early store to the input (e.g., source) of the bulk memory operation or an early load to the output (e.g., destination) of the bulk memory operation. An example of a conflicting memory access includes a write access of a memory access request that overlaps a source range of the pending memory range 118. Another example of a conflicting memory access includes a read access or write access of a memory access request that overlaps a destination range of the pending memory range 118. It is to be appreciated that various access patterns cause conflicting accesses without departing from the spirit or scope of the described techniques.

When no memory access conflict is detected, the logic controller 104 passes the bulk memory operation through to memory 106 (e.g., according to a default schedule of operation). When the logic controller 104 detects a memory access conflict, the logic controller 104 processes a memory access of the bulk memory operation early (e.g., earlier than scheduled, expedites, processes eagerly, immediately) and before the logic controller 104 allows the conflicting memory access to proceed. Once the memory access of the bulk memory operation completes, the logic controller 104 allows the conflicting memory access to proceed. In some implementations, the logic controller 104 executes the memory access of the bulk memory operation based on the pending operation entry specifying which memory access is being performed. In some implementations, the logic controller 104 raises an interrupt to the processing unit 102 to perform the memory access of the bulk memory operation (e.g., to perform the memory access of the bulk memory operation immediately).

In some implementations, when the logic controller 104 detects a memory access conflict, the logic controller 104 blocks the conflicting operation until the memory access of the bulk memory operation is performed. In some variations, the logic controller 104 blocks the conflicting memory access until a target address is no longer pending in the pending range store. In one or more cases, the memory access of the bulk memory operation is associated with a timeout that triggers an interrupt to avoid starvation of the affected memory location.

The address of an expedited memory access of the bulk memory operation is referred to as an expedited access address. In some implementations, the logic controller 104 logs an expedited access address (e.g., address range, set of pages) of an expedited memory access of the bulk memory operation in the expedited address lookup table 116. In at least one case, the expedited address lookup table is indexed by the expedited access address.

When a memory access of the bulk memory operation is eagerly performed (e.g., expedited), the logic controller 104 tracks the one or more addresses associated with the memory access to ensure that the memory access is not repeated by the bulk memory operation (e.g., a subsequent eagerly performed memory access). When the logic controller 104 detects a memory access conflict and the memory access of the bulk memory operation has not already been eagerly performed, then the logic controller 104 expedites the memory access of the bulk memory operation. When the memory access of an expedited access address is idempotent (e.g., idempotent being specified in the address range store) and a conflicting memory access request does not modify memory 106, the logic controller 104 declines to track that expedited access address.

In some implementations, the logic controller 104 checks the expedited access address to verify that the memory access of the bulk memory operation has been performed. When the check indicates the memory access has been performed, the logic controller 104 ignores any subsequent memory access request (e.g., a repeated request) associated with the expedited memory access. When the check indicates an address of a memory access is not in the expedited address lookup table 116, the logic controller 104 allows the memory access to pass through to memory 106, or expedites the memory access when a memory access conflict is detected.

When expedited access addresses are being tracked, the logic controller 104 intercepts memory accesses issued for the pending bulk memory operation when they conflict with an expedited access address (e.g., based on an individual address). When logic controller 104 determines that the memory access of the bulk memory operation has already been performed for a given expedited access address, the logic controller 104 intercepts and discards the associated stored address or addresses (e.g., prevents a redundant memory access from accessing the memory 106).

In some implementations, the logic controller 104 differentiates memory accesses of a bulk memory operation from a conflicting memory access based on a bit in a memory access request of the bulk memory operation or a bit in a memory access request of the conflicting memory access (e.g., or a bit in both requests). In one or more cases, the bit is set in the request by processing unit 102 or an application.

In some implementations, the logic controller 104 performs a bulk memory operation lazily or when computationally convenient. For example, when a bulk memory operation is issued during a period of relatively high memory bandwidth utilization, the logic controller 104 delays (e.g., throttles) the bulk memory operation until memory usage decreases.

In some implementations, all potentially conflicting memory accesses are routed through the logic controller 104. In some examples, the logic controller 104 uses flushing cache levels (e.g., when the logic controller 104 is located in the hierarchy of memory 106 to prevent conflicting memory accesses hitting in or affecting near cache or local cache). In some examples, the location of the logic controller 104 ensures that remote memory accesses do not occur (e.g., when the logic controller 104 is located at a near cache, remote cache accesses do not pass through the logic controller 104).

In some implementations, the logic controller 104 uses different levels of precision for tracking of pending memory ranges. For idempotent bulk memory operations that are performed multiple times without impacting the final result of the memory access (e.g., memcpy, memset), the logic controller 104 tracks the pending memory range 118 in a coarse-grain and approximate manner. In this example, the logic controller 104 loosely tracks whether the bulk memory operation has been performed and executes the bulk memory operation when tracking generally indicates (e.g., based on probability, greater than 50% chance) that the bulk memory operation has not been performed. When coarse-grain tracking results in a redundant idempotent bulk memory operation, the redundant operation does not impact the final result of the memory access.

For non-idempotent bulk memory operations, the logic controller 104 tracks the pending memory range 118 in a fine-grain and precise manner to prevent redundant operations. Thus, for fine-grain operations, the logic controller 104 verifies whether the bulk memory operation corresponding to the conflicting address has or has not been performed with higher certainty (e.g., at least 75% certainty, at least 90% certainty, 100% certainty, etc.). When the logic controller 104 determines the order of operations of the bulk memory operation and conflicting memory access ahead of execution, the logic controller 104 implements fine-grain operations by tracking a count of how many memory accesses of the bulk memory operation have been performed. On a possible conflict, the logic controller 104 statically determines whether the current count includes the target address.

Figure 2:
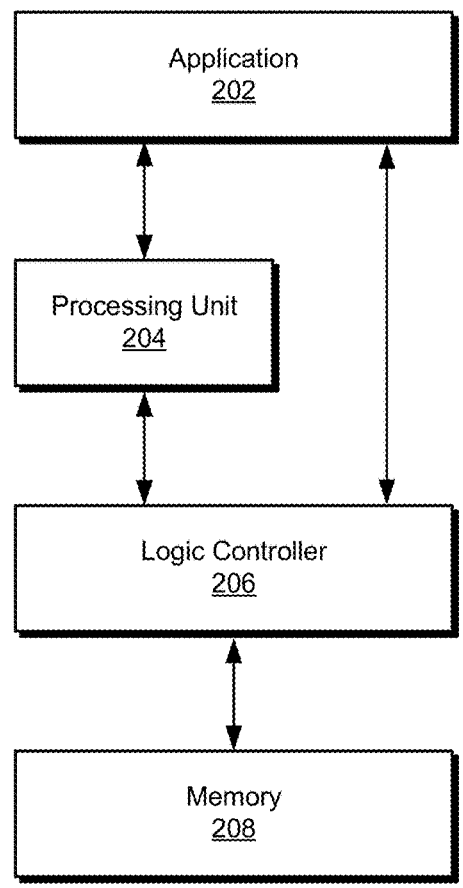
FIG. 2 is a block diagram of a non-limiting example implementation of a non-blocking processing system.

FIG. 2 is a block diagram of a non-limiting example implementation 200 of a non-blocking processing system. The described techniques of the non-blocking processing system improve system performance by allowing tasks that otherwise would wait for the completion of a bulk memory operation to proceed without being blocked, while maintaining data integrity.

The implementation 200 depicts an application 202, a processing unit 204 (e.g., a non-limiting example of the processing unit 102), logic controller 206 (e.g., a non-limiting example of the logic controller 104), and memory 208 (e.g., a non-limiting example of the memory 106). As shown, the application 202 is communicatively linked to the processing unit 204 and the logic controller 206, and the logic controller 206 is communicatively linked to the processing unit and the memory 208.

Consider an illustrative example scenario of the implementation 200 where the application 202 initiates a bulk memory operation. The application 202 requests the processing unit 204 execute the bulk memory operation. The processing unit 204 generates and provides to the logic controller 206 a pending memory entry (e.g., pending memory address range(s)) for the bulk memory operation. In one or more cases, the processing unit 204 continues executing code subsequently issued after initiation of the bulk memory operation or during the bulk memory operation as if the bulk memory operation is completed.

In some implementations, the logic controller 206 initiates execution of the bulk memory operation. After issuing the requests to execute the bulk memory operation, the application 202 issues a memory access request that conflicts with the bulk memory operation. The logic controller 206 intercepts the conflicting memory access request. The logic controller 206 identifies the memory access (e.g., fine grain operation) of the bulk memory operation that conflicts with the memory access request. As a result, the logic controller 206 executes the identified memory access eagerly (e.g., expedites the identified memory access). When the logic controller 206 determines that the conflicting memory access request modifies a state of memory 208, (e.g., a store to the source data range for the bulk memory operation), the logic controller 206 inserts the expedited memory access into an expedited address lookup table (e.g., the expedited address lookup table 116). The logic controller 206 then allows the intercepted conflicting memory access request to proceed.

In some implementations, the logic controller 206 identifies a memory access request that modifies the memory 208 and that matches the address of the expedited memory access that was entered in the expedited address lookup table. The logic controller 206 discards the identified memory access request based on the memory access already having been eagerly performed. When the logic controller 206 determines the bulk memory operation is completed, the logic controller 206 stops monitoring for conflicting memory accesses (e.g., for at least that bulk memory operation).

Figure 3:
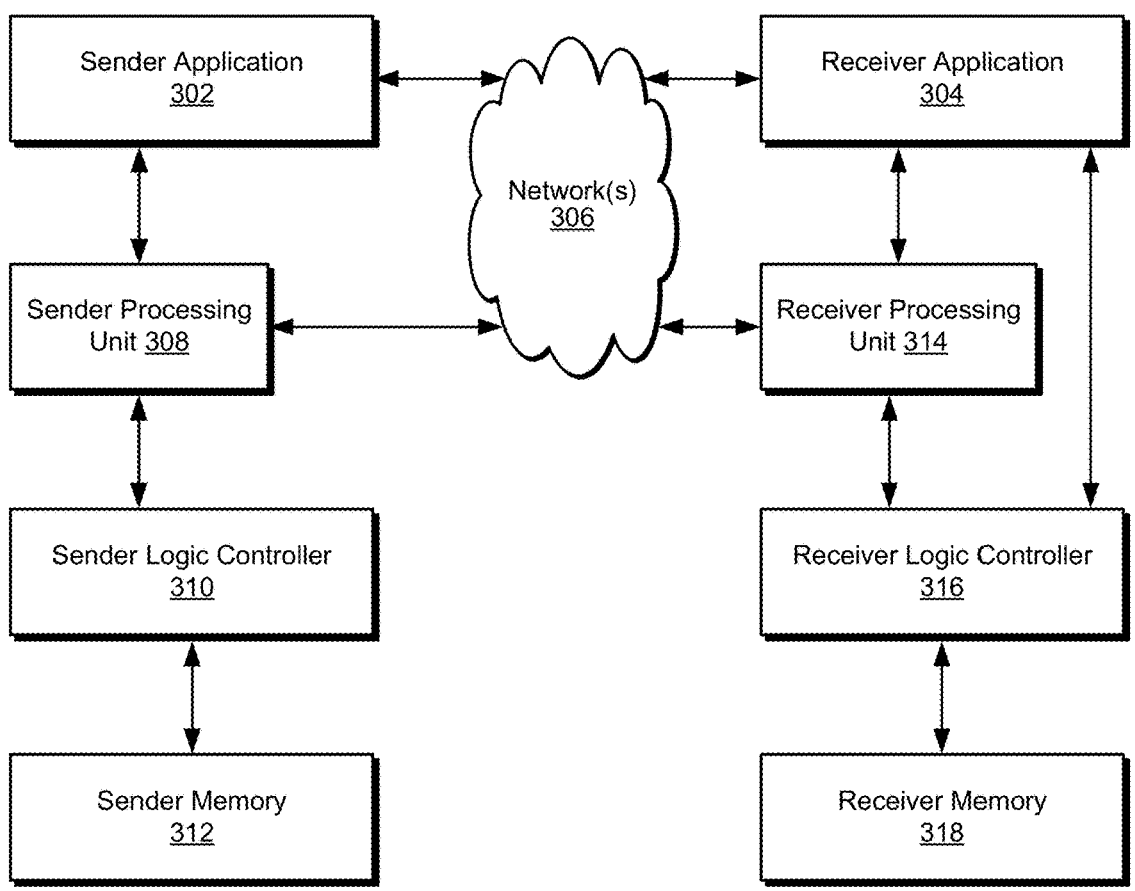
FIG. 3 is a block diagram of a non-limiting example implementation of a non-blocking processing system.

FIG. 3 is a block diagram of a non-limiting example implementation 300 of a non-blocking processing system. The implementation 300 depicts a sender application 302 and a receiver application 304 (e.g., non-limiting examples of the application 202), a network 306 (e.g., a wired connection, wireless connection, internet connection, cellular connection, etc.), sender processing unit 308 and receiver processing unit 314 (e.g., non-limiting examples of the processing unit 102 and the processing unit 204), sender logic controller 310 and receiver logic controller 316 (e.g., non-limiting examples of the logic controller 104 and the logic controller 206), sender memory 312 and receiver memory 318 (e.g., non-limiting examples of the memory 106 and the memory 208).

As shown, the sender application 302 is communicatively linked to the sender processing unit 308 and the network 306, the sender processing unit 308 is communicatively linked to the sender logic controller 310 and the network 306, and the sender logic controller 310 is communicatively linked to the sender memory 312. Also as shown, the receiver application 304 is communicatively linked to the receiver processing unit 314 and the network 306, the receiver processing unit 314 is communicatively linked to the receiver logic controller 316 and the network 306, and the receiver logic controller 316 is communicatively linked to the receiver memory 318.

Consider an illustrative example scenario of the implementation 300 where sender application 302 initiates a bulk copy operation between the sender application 302 and receiver application 304. The sender application 302 requests the sender processing unit 308 execute the bulk copy operation. The sender processing unit 308 generates and provides to the sender logic controller 310 a pending memory entry (e.g., pending memory address range(s)) for the bulk copy operation.

In some implementations, the sender processing unit 308 provides the pending memory entry to the receiver processing unit 314 via network 306, and the sender processing unit 308 provides the pending memory entry to the receiver logic controller 316. Additionally or alternatively, the sender application 302, the sender processing unit 308, and/or the sender logic controller 310 communicates directly with the receiver logic controller 316 via the network 306. In one or more cases, the sender application 302 provides the pending memory entry to the receiver application 304 via network 306, and receiver application 304 provides the pending memory entry to the receiver logic controller 316. In at least one case, the sender application 302 informs the receiver application 304 to proceed as if the bulk copy operation is completed. Thus, in one or more cases, the receiver processing unit 314 continues executing code subsequently issued after initiation of the bulk copy operation or during the bulk copy operation as if the bulk copy operation is completed.

In some implementations, the sender logic controller 310 begins executing the bulk copy operation. The receiver application 304 then issues a memory request that conflicts with the bulk copy operation. The memory request is intercepted by the receiver logic controller 316.

The receiver logic controller 316 identifies the memory access of the bulk copy operation that conflicts with the memory request and performs the identified memory access eagerly (e.g., expedites the memory access of the bulk copy operation). In the illustrated example, the memory access of the bulk copy operation includes the sender logic controller 310 reading data from the sender memory 312, the sender logic controller 310 transmitting the data to the receiver logic controller 316 via the network 306, and the receiver logic controller 316 writing the data to the receiver memory 318.

When the conflicting memory access request modifies a memory state of the receiver memory 318 (e.g., a store to a target address of the receiver memory 318), then the receiver logic controller 316 inserts the address of the expedited memory access into an expedited address lookup table of the receiver logic controller 316 (e.g., the expedited address lookup table 116). The receiver logic controller 316 then allows the intercepted conflicting memory access request to proceed.

When the receiver logic controller 316 identifies a memory access request (e.g., a request that modifies the receiver memory 318, that matches an address in the expedited address lookup table (e.g., a repeat of the eagerly performed memory access), the receiver logic controller 316 discards the conflicting memory access request since the memory access is already eagerly performed.

When the sender logic controller 310 determines the bulk copy operation is completed (e.g., based on a notification initiated by the sender processing unit 308 or the receiver processing unit 314), the sender logic controller 310 stops monitoring for conflicting memory accesses (e.g., for at least that bulk copy operation). When the receiver logic controller 316 determines the bulk copy operation is completed (e.g., based on a notification initiated by the sender processing unit 308 or the receiver processing unit 314), the receiver logic controller 316 stops monitoring for conflicting memory accesses (e.g., for at least that bulk copy operation). It is to be appreciated that the described techniques are usable in connection with a variety of bulk memory operations across one or more networks and that involve multiple applications, processing units, logic controllers, and/or memories.

Figure 4:
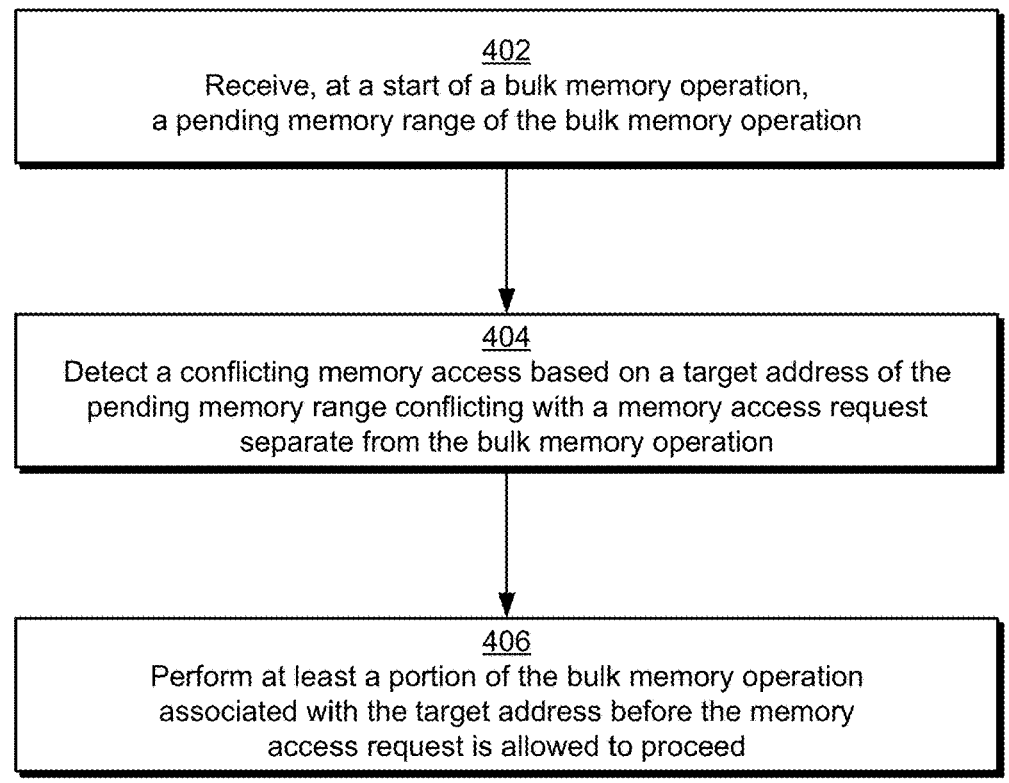
FIG. 4 is a flow diagram depicting an algorithm as a step-by-step procedure in an example of implementing a non-blocking processing system.

FIG. 4 is a flow diagram depicting an algorithm as a step-by-step procedure 400 in another example of implementing a non-blocking processing system configured to process bulk memory operations.

At a start of a bulk memory operation, a pending memory range of the bulk memory operation is received (block 402). By way of example, the processing unit 102 provides the bulk memory operation to the logic controller 104. In at least one case, an application (e.g., the application 202) initiates the bulk memory operation and the processing unit 102 provides the pending memory range (e.g., a range of addresses associated with the bulk memory operation) to the pending range store 114.

A conflicting memory access is detected based on a target address of the pending memory range conflicting with a memory access request separate from the bulk memory operation (block 404). By way of example, the logic unit 108 (e.g., via the check conflict logic 110) monitors memory access requests in relation to the bulk memory operation. In one or more case, this monitoring is triggered by the processing unit 102 providing the pending memory range to the pending range store 114. In some examples, the logic unit 108 detects the conflicting memory access based on the monitoring. In some implementations, the target address is part of the pending memory range of the bulk memory operation. The target address is associated with a memory access of the bulk memory operation (e.g., a write access to the target address).

At least a portion of the bulk memory operation associated with the target address is performed before the memory access request is allowed to proceed (block 406). By way of example, the logic unit 108 performs the portion of the bulk memory operation (e.g., a memory access) associated with the target address before the conflicting memory access request is allowed to proceed. In one or more examples, the logic unit 108 blocks the conflicting memory access request until the logic unit 108 determines that the portion of the bulk memory operation is completed. Once the logic unit 108 detects that the portion of the bulk memory operation is completed (e.g., and before the overall bulk memory operation is completed), the logic unit 108 allows the conflicting memory access request to proceed. In at least one implementation, the logic unit 108 eagerly performs (e.g., expedites) the portion of the bulk memory operation in response to detecting the conflicting memory access. Once the logic unit 108 detects that the portion of the bulk memory operation is eagerly performed, the logic unit 108 allows the conflicting memory access request to proceed.

Figure 5:
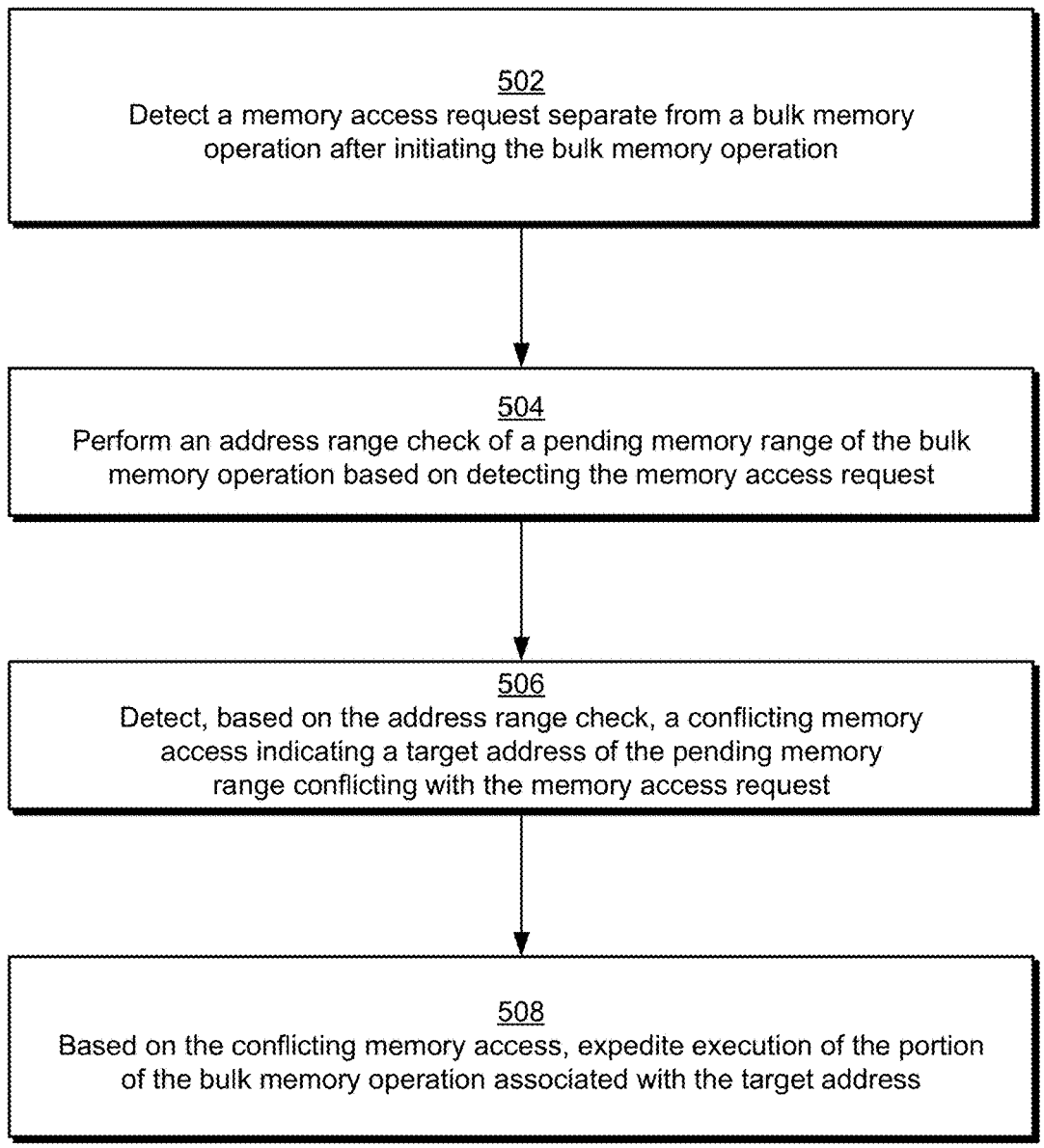
FIG. 5 is a flow diagram depicting an algorithm as a step-by-step procedure in another example of implementing a non-blocking processing system.

FIG. 5 is a flow diagram depicting an algorithm as a step-by-step procedure 500 in an example of implementing a non-blocking processing system configured to process bulk memory operations. In one or more implementations, at least a portion of the procedure 500 is executed as a part of the procedure 400 of FIG. 4 (e.g., at block 404 or block 406). Alternatively, the procedure 500 is executed separately from the procedure 400.

A memory access request separate from a bulk memory operation is detected after initiating the bulk memory operation (block 502). By way of example, the logic unit 108 (e.g., via the check conflict logic 110) detects a memory access request that conflicts with at least a portion of the bulk memory operation. The detected memory access request is independent of the bulk memory operation and occurs after the bulk memory operation is initiated.

An address range check of a pending memory range of the bulk memory operation is performed based on detecting the memory access request (block 504). By way of example, the address range check includes the logic unit 108 comparing an address or an address range of the detected memory access request with at least one address of the pending memory range (e.g., with an address or an address range of the bulk memory operation). In at least one implementation, the address range check includes the logic unit 108 comparing a page address of the detected memory access request with one or more page entries of the pending memory range.

Based on the address range check, a conflicting memory access is detected indicating a target address of the pending memory range (e.g., a target address associated with a portion of the bulk memory operation) conflicting with the memory access request (block 506). By way of example, the logic unit 108 (e.g., via the check conflict logic 110) detects the conflicting memory access based on the logic unit 108 monitoring the pending memory range in parallel with execution of the bulk memory operation.

Based on the conflicting memory access, execution of the portion of the bulk memory operation associated with the target address is expedited (block 508). By way of example, the logic controller 104 eagerly performs (e.g., expedites, performs early) the portion of the bulk memory operation to ensure the memory access request is not executed before the logic controller 104 finishes eagerly performing the portion of the bulk memory operation.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, at least one of the processing unit 102, the logic controller 104, the logic unit 108, or the memory 106) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors (e.g., the processing unit 102, the logic controller 104, and/or the logic unit 108) include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), one or more Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums (e.g., the memory 106, the pending range store 114, the expedited address lookup table 116) include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A logic controller comprising:
a pending range store to receive, at a start of a bulk memory operation, a pending memory range of the bulk memory operation; and
a logic unit to:
detect, by performing an address range check of the pending memory range or a page address comparison with an entry of the pending memory range, a conflicting memory access based on a target address of the pending memory range conflicting with a memory access request separate from the bulk memory operation; and
perform at least a portion of the bulk memory operation associated with the target address before the memory access request is allowed to proceed.

2. The logic controller of claim 1, wherein the logic controller intercepts memory operations, including the bulk memory operation, between a processing unit of a computing device and a memory of the computing device, the logic controller being physically located between the processing unit and the memory.

3. The logic controller of claim 1, wherein, based on the conflicting memory access, the logic unit is further configured to block the conflicting memory access until the target address is no longer pending in the pending memory range of the pending range store.

4. The logic controller of claim 1, wherein, based on the conflicting memory access, the logic unit is further configured to expedite execution of at least the portion of the bulk memory operation associated with the target address.

5. The logic controller of claim 4, further comprising an expedited address lookup table, wherein, based on the execution being expedited, the logic unit is further configured to log the target address in the expedited address lookup table.

6. The logic controller of claim 5, wherein the logic unit is further configured to:
perform the address range check on the expedited address lookup table before execution of the portion of the bulk memory operation is expedited; and
allow the execution to proceed when the address range check indicates the portion of the bulk memory operation associated with the target address is not already executed.

7. The logic controller of claim 5, wherein the logic unit is further configured to:
perform the address range check on at least one address of the pending memory range of the bulk memory operation or the expedited address lookup table; and
discard the memory access request when the address range check indicates the portion of the bulk memory operation associated with the target address is completed.

8. The logic controller of claim 1, wherein the logic unit is further configured to store memory access types associated with the bulk memory operation, and wherein detecting the conflicting memory access is based at least in part on an access type of the memory access request.

9. The logic controller of claim 1, wherein the logic unit is further configured to receive an updated pending memory range different from the pending memory range at the start of the bulk memory operation, the updated pending memory range removing one or more completed addresses from the pending memory range associated with a completed portion of the bulk memory operation.

10. The logic controller of claim 1, wherein logic unit is further configured to use one level of a plurality of levels of precision for tracking of the pending memory range based on whether the bulk memory operation is idempotent.

11. The logic controller of claim 1, wherein the logic controller differentiates the target address of the pending memory range from an address associated with the memory access request separate from the bulk memory operation based on a first bit in the target address or a second bit in the address associated with the memory access request separate from the bulk memory operation.

12. The logic controller of claim 5, wherein the expedited address lookup table is indexed by expedited access addresses.

13. A method for non-blocking parallel bulk memory operations, the method comprising:
receiving, at a start of a bulk memory operation, a pending memory range of the bulk memory operation;
detecting, by performing an address range check of the pending memory range or a page address comparison with an entry of the pending memory range, a conflicting memory access based on a target address of the pending memory range conflicting with a memory access request separate from the bulk memory operation; and
performing at least a portion of the bulk memory operation associated with the target address before the memory access request is allowed to proceed.

14. The method of claim 13, further comprising blocking the conflicting memory access until the target address is no longer pending in the pending memory range that is stored in a pending range store.

15. The method of claim 13, further comprising expediting, based on the conflicting memory access, execution of at least the portion of the bulk memory operation associated with the target address.

16. The method of claim 15, wherein the expediting execution comprises:
logging the target address in an expedited address lookup table;
performing the address range check on the expedited address lookup table before execution of the portion of the bulk memory operation is expedited; and
allowing the execution to be expedited when the address range check indicates the portion of the bulk memory operation associated with the target address is not already executed.

17. A system comprising:
a processing unit;
a memory; and
a logic controller physically located between and communicatively linked to the processing unit and the memory, the logic controller being configured to:
receive, from the processing unit at a start of a bulk memory operation, a pending memory range of the bulk memory operation, the pending memory range including at least one of a starting address, a source memory range, or a destination memory range;
detect, by performing an address range check of the pending memory range or a page address comparison with an entry of the pending memory range, a conflicting memory access based on a target address of the pending memory range conflicting with a memory access request of the memory separate from the bulk memory operation; and
send a portion of the bulk memory operation associated with the target address to the memory before the memory access request is allowed to proceed.

18. The system of claim 17, wherein, based on the conflicting memory access, the logic controller is further configured to block the conflicting memory access until the target address is no longer pending in the pending memory range that is stored in a pending range store.

19. The system of claim 17, wherein, based on the conflicting memory access, the logic controller is further configured to expedite execution of the portion of the bulk memory operation associated with the target address, the logic controller including at least one of check conflict logic or check address logic, the check conflict logic being configured to track the bulk memory operation and intercept memory accesses that conflict with or are part of the bulk memory operation, and the check address logic being configured to check an address associated with a potential conflicting memory access request against the pending memory range of the bulk memory operation.

20. The system of claim 19, wherein to expedite the execution includes the logic controller being further configured to:
log the target address in an expedited address lookup table;
perform the address range check on the expedited address lookup table before execution of the portion of the bulk memory operation is expedited; and allow the execution to be expedited when the address range check indicates the portion of the bulk memory operation associated with the target address is not already executed.

* * * * *